US006775394B2

(12) United States Patent
Yu

(10) Patent No.: US 6,775,394 B2
(45) Date of Patent: Aug. 10, 2004

(54) DIGITAL WATERMARKING OF BINARY DOCUMENT USING HALFTONING

(75) Inventor: Hong Heather Yu, Princeton Jct., NJ (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 6 days.

(21) Appl. No.: 10/095,493

(22) Filed: Mar. 12, 2002

(65) Prior Publication Data

US 2003/0174857 A1 Sep. 18, 2003

(51) Int. Cl.⁷ .............................................. G06K 9/00
(52) U.S. Cl. ........................................................ 382/100
(58) Field of Search ................................ 382/100, 212, 382/232; 358/1.9, 3.28; 380/51–54, 210, 287; 713/176

(56) References Cited

U.S. PATENT DOCUMENTS

| | | | |
|---|---|---|---|
| 3,564,130 A | | 2/1971 | Crooks et al. |
| 3,564,131 A | | 2/1971 | Herold et al. |
| 5,073,925 A | | 12/1991 | Nagata et al. |
| 5,499,294 A | | 3/1996 | Friedman |
| 5,710,636 A | * | 1/1998 | Curry .......................... 358/298 |
| 5,734,752 A | * | 3/1998 | Knox .......................... 382/212 |
| 5,765,176 A | * | 6/1998 | Bloomberg ................. 715/514 |
| 5,790,703 A | * | 8/1998 | Wang .......................... 382/212 |
| 5,862,260 A | | 1/1999 | Rhoads |
| 5,905,800 A | | 5/1999 | Moskowitz et al. |
| 5,905,819 A | | 5/1999 | Daly |
| 5,915,027 A | | 6/1999 | Cox et al. |
| 6,252,971 B1 | | 6/2001 | Wang |
| 6,263,086 B1 | | 7/2001 | Wang |
| 6,285,775 B1 | | 9/2001 | Wu et al. |
| 6,456,393 B1 | * | 9/2002 | Bhattacharjya et al. ...... 358/1.9 |

FOREIGN PATENT DOCUMENTS

| | | | |
|---|---|---|---|
| EP | 0 840 513 | 11/1997 | |
| EP | 0 860 997 | 2/1998 | |
| EP | 0 901 282 | 8/1998 | |
| EP | 0 903 943 | 9/1998 | |
| JP | 2001/309150 A | * 11/2001 | .......... H04N/1/387 |

OTHER PUBLICATIONS

Kracker et al. "Joint halftoning and watermarking" Proc. International Conference on Image Processing 2000, vol. 2, p. 69–72, Sep. 2000.*

Wu et al. "Data hiding in a digital binary image" IEEE International Conference on ICME 2000 vol. 1, p. 393–396, Jul. 2000.*

Cox et al., "A Secure Robust Watermark for Multimedia", University of Cambridge, May 1996, pp. 1–16.

(List continued on next page.)

*Primary Examiner*—Jingge Wu
(74) *Attorney, Agent, or Firm*—Harness, Dickey & Pierce, PLC

(57) ABSTRACT

The present invention is a method for hiding data in document contents. The method comprises receiving information relating to the document contents, wherein at least part of the document contents are of a binary nature, converting the data to halftone pixel groups according to predefined binary classifications associated with combinations of halftone pixels, and embedding the halftone pixel groups into a binary portion of the document contents. Further, the present invention is a method for extracting data hidden in document contents. The method comprises receiving information relating to the document contents, wherein the document contents include halftone pixel groups, extracting the halftone pixel groups from the document contents, and converting the halftone pixel groups to the data according to predefined binary classifications associated with combinations of halftone pixels.

14 Claims, 7 Drawing Sheets

OTHER PUBLICATIONS

Cox, et al., "A Review of Watermarking And The Importance of Perceptual Modeling", NEC Research Institute, Feb. 1997.

Coppersmith, et al., "Fragile Imperceptible Digital Watermark With Privacy Control", SPIE vol. 3657, Jan. 1999, pp. 79–84.

Brassil, et al., "Electronic Marking and Identification Techniques to Discourage Document Copying", AT&T Laboratories.

Brassil, et al., "Hiding Information in Document Images", AT&T Laboratories.

Liu, Yong, et al., "Marking and Detection of Text Documents Using Transform–domain Techiques", SPIE vol. 3657, Jan. 1999, pp. 317–328.

Bender, et al., "Techniques for Data Hiding", IMB Systems Journal, vol. 35, Nos. 3&4, 1996, pp. 313–336.

Boney, et al., "Digital Watermarks for Audio Signals", IEEE Workshop on Proceedings of Multimedia, 1996, pp. 473–480.

Bittman, et al., "Robust MPEG Video Watermarking Technologies", ACM Multimedia, 1998, pp. 71–80.

Lin, et al., "ISSues and Solution for Authenticating MPEG Video", SPIE vol. 3657, Jan, 1999, pp. 54–65.

Ramkumar, et al., "Information Theoretic Bounds for Data Hiding in Compressed Images", IEEE $2^{nd}$ Multimedia Signal Processing Workshop, 1998.

Cox, et al., "Secure Spread Spectrum Watermarking for Multimedia", IEEE Trans. on IMage Processing, vol. 6, No. 12, 1997.

Podlichuk, et al., "image Adaptive Watermarking Using Visual Models", IEEE Journal Selected Areas of Communications, vol. 16, No. 4, May 1998.

Herrigel, et al., "Secure Copyright Protection Techniques for Digital Images", Second Info. Hiding Workshop, 1998.

Zeng, et al., "On resolving Rightful Ownership of Digital Images by Invisible Watermarks", ICIP, 1997.

Koch et al., "Towards Robust and Hidden Image Copyright Labeling", IEEE Workshop on Nonlinear Signal and Image Processing, 1995.

Swanson, et al., "Robust Data Hiding for Images", IEEE DSP Workshop, 1996.

Zeng, et al., "Extraction of Multiresolution Watermark Images for Resolving Rightful Ownership", Electronic Imaging '99, Proc. of SPIE, vol. 3657, 1999.

Tao, et al., "Adaptive Watermarking in the DCT Domain", IEEE Workshop, 1997.

* cited by examiner

DIGITAL WATERMARKING OF BINARY DOCUMENT USING HALFTONING

FIELD OF THE INVENTION

The present invention generally relates to digital information processing and particularly relates to document authentication and steganography with digital watermarking and techniques.

BACKGROUND OF THE INVENTION

There is considerable interest today in authenticating documents and digital watermarking techniques, and various systems and methods have been developed that hide information within document contents with digital watermark. Most of the efforts relating to data hiding, however, have been directed toward non-binary document contents like images.

With gray scale and color images (referred to as images hereafter), the capacity for data hiding is greatly increased due to the non-binary nature of the document contents. For example, each pixel of an image is generally represented in digital form by a number of many bits in length. The increased length of the number is necessary to represent the many hues in color images, and also necessary to represent the many shades in grey scale images. Thus, least significant bit modulation with non-binary data in digital form can accomplish hiding of data that only appears as an imperceptible shift in hue or shading of pixels in the displayed or printed document. This technique, however, is not generally applicable to document contents of a binary nature.

The main difficulty related to hiding data in document contents of a binary nature, like graph or text, lies in the binary nature of the data. In other words, these document contents have only one bit per pixel. Thus, modulation of digits of digital forms of the data results in reversal of the data contents wherever the modulation occurs. As a result, a minimal alteration of bits in a binary graph, for example, can result in a substantial change in the appearance and content of the graph. Overall, data is generally difficult to hide in document contents of this type, but methods have been developed for hiding data in text.

Methods for hiding data in text take advantage of the fact that minimal alteration of bits in a binary graph does not as severely alter appearance and content of text as with graph. Thus, altering the length of vertical strokes, and altering word and/or line spacing are used to hide data in text. For example, conventional space-shifting methods and serif-modification methods are proposed in "Electronic Marking and Identification Techniques to Discourage Document Copying", J. Brassil, S. Low, N. Maxemchuk, and L. O'Gorman, IEEE Infocom 94, and in "Document Marking and Identification using Both Line and Word Shifting", S. H. Low, N. F. Maxemchuk, J. T. Brassil, and L. O'Gorman, Infocom '95, both incorporated herein by reference. These methods cannot be successfully applied to graph, however, because graph often does not possess the same characteristics as text, even on the pixel level. Thus, there remains a need for a solution to the problems relating to hiding data in document contents of a binary nature, and especially for hiding data in graph. Providing such a solution remains the task of the present invention.

SUMMARY OF THE INVENTION

In a first aspect, the present invention is a method for hiding data in document contents. The method comprises receiving information relating to the document contents, wherein at least part of the document contents are of a binary nature, converting the data to halftone pixel groups according to predefined binary classifications associated with combinations of halftone pixels, and replacing a binary portion of the document contents with the halftone pixel groups.

In a second aspect, the present invention is a method for extracting data hidden in document contents. The method comprises receiving information relating to the document contents, wherein the document contents include halftone pixel groups, extracting the halftone pixel groups from the document contents, and converting the halftone pixel groups to the data according to predefined binary classifications associated with combinations of halftone pixels.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
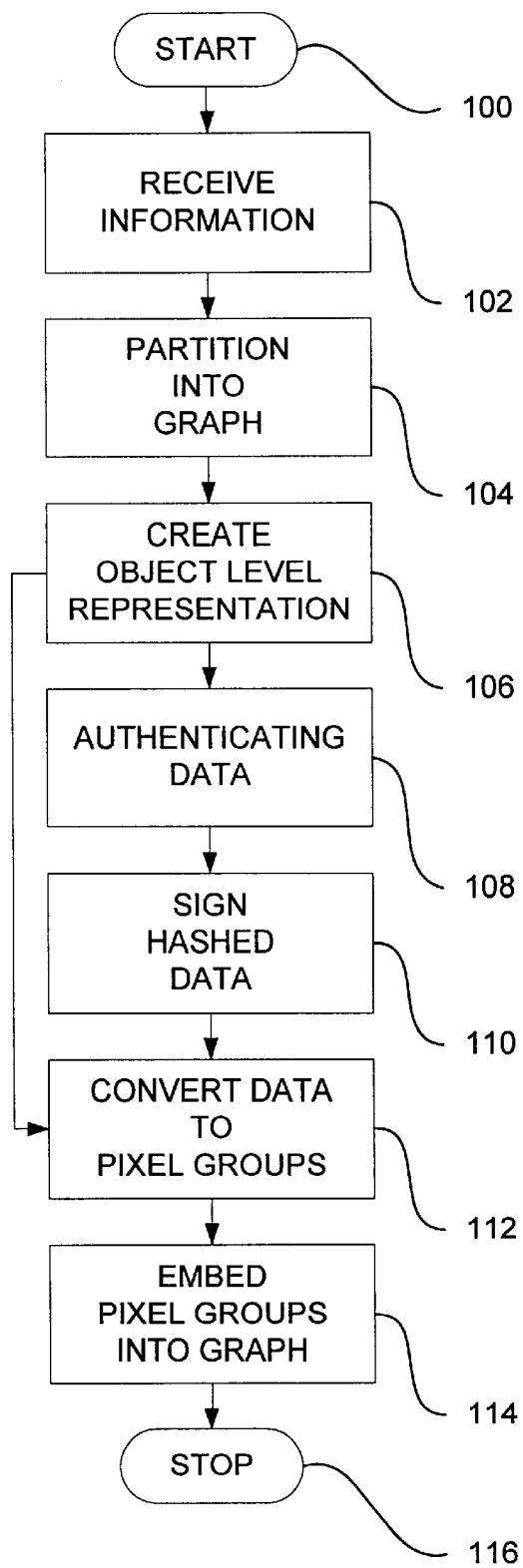
FIG. 1 is a flowchart diagram of a method of hiding data according to the present invention.

Referring to FIG. 1, a presently preferred method for hiding data, or digital watermark information, in document contents of binary nature is shown. This method contains several steps, some of which are not essential to the present invention, but are merely included to demonstrate the presently preferred embodiment. The method is also demonstrated with a present example.

Starting at 100 and proceeding to step 102, information relating to the document contents is received, and this information may take several forms. In an exemplary form, the information corresponds to the document in digital form as an electronic file, and this file may constitute the original form of the document, a scanned bitmap from a physical document, or similar incarnations of the document. In the present example, the information received corresponds to a bit map of a document containing graph and text, all of which is binary content, but the information could also contain content of a non-binary nature in addition to the binary content.

At step 104, the document is partitioned into textual and graphical content, and partitioning of graphs from text regions in a document has been the subject of considerable study. For example, U.S. Pat. No. 5,465,304, and U.S. Pat. No. 5,335,290 to Cullen, et al., incorporated herein by reference, discuss the segmentation of text, pictures, and lines of a document image. Further, U.S. Pat. No. 5,073,953 to Westdijk, incorporated herein by reference, discloses a system and method for automatic document segmentation. Still further, separation of body text from other regions of a document is taught in U.S. Pat. No. 5,892,843 to Zhou, et al., incorporated herein by reference. Also, in U.S. Pat. No. 5,379,130 to Wang, et al., a method and system that separates images from text is disclosed. Any of these techniques or other well known approaches can be readily adapted to perform partitioning step 104. This step 102 may be optional, even in a preferred embodiment, under certain circumstances. Such circumstances occur, for example, where the document contains only graph, where the information received in step 102 consists of a portion of document content extracted during a partitioning process, in the process of creating a digital document, and under similar circumstances.

At step 106, an object level representation of the graph portion of the text is created, and this object level representation in digital form corresponds to the digital watermark information, or data. Further embodiments may use other kinds or combinations of digital watermark information, such as a publication source and/or date of publication of the document for use with detecting copyright infringement. Using an object level representation of the graph, however, enables detection of alterations of the original document as further detailed below. The presently preferred process by which the object level representation of the graph is created involves defining properties of nodes and lines of the graph, including the shape, size, color, position, and annotation of the nodes, and describing them with the specification symbols. The process further involves defining conditions and familial relationships between the nodes with relationship symbols. This process may be computerized, but could also be accomplished offline and/or customized to reflect the visual perceptions and/or cognitive meanings associated with particular portions of the graph.

Figure 2:
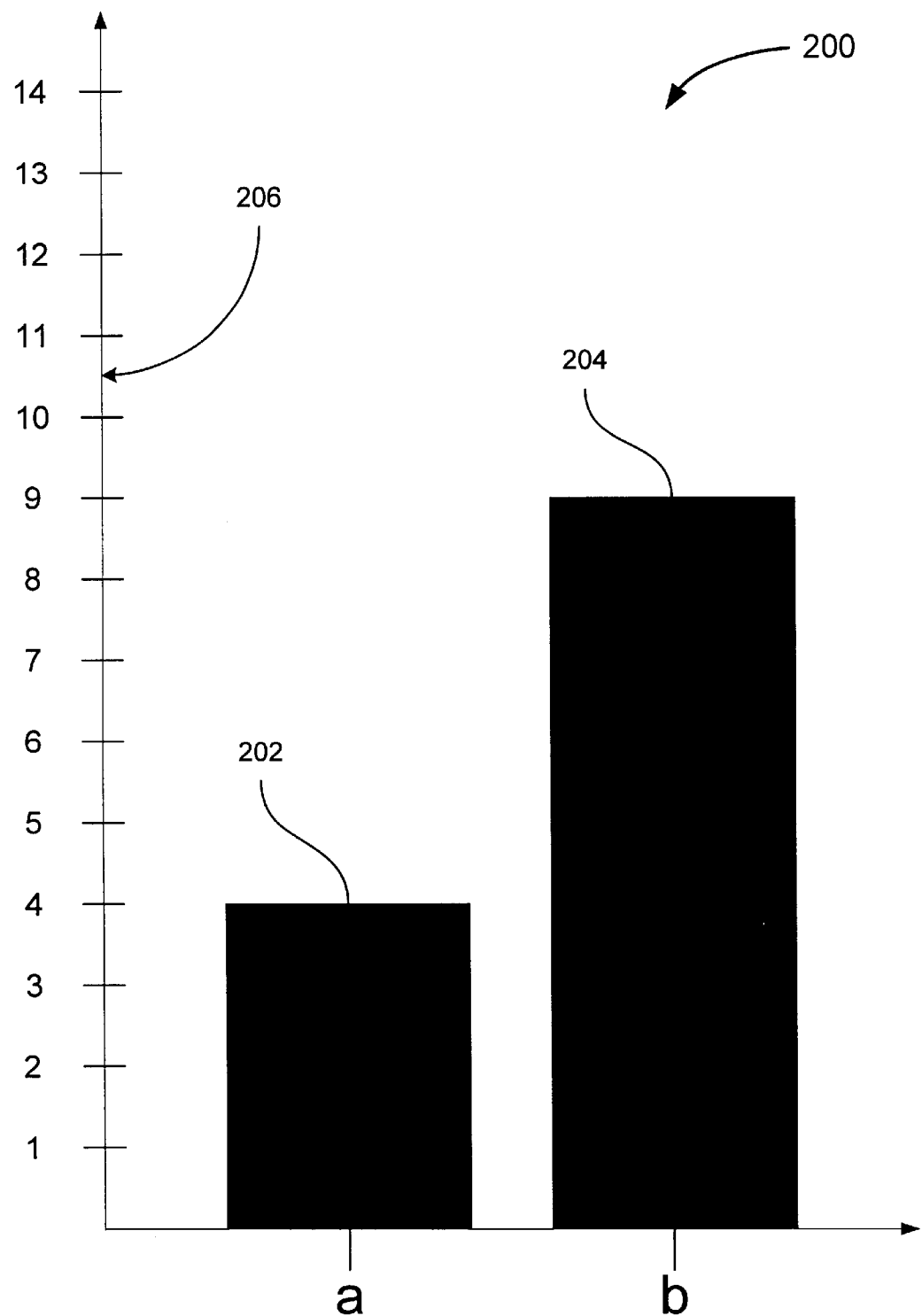
FIG. 2 is a sample graph corresponding to a bar graph for use in demonstrating the present invention.

Step 106 is further explained in the present example with reference to FIG. 2, wherein an exemplary graph is shown. It is important to note that the important characteristics of an object depend on the type of graph. Thus, in the case of the bar chart 200 of FIG. 2, the important information is the actual value depicted by each bar (i.e. the information contained in the relative height of each individual bar) rather than the overall height of the graph. Similarly, the important information in a pie chart is contained in the relative arc length described by each individual pie piece illustrating the actual value rather than the overall radius of the pie. In both bar chart and pie chart, annotation may also be important information. Further types of graph have additional and/or different important characteristics that are similarly determinable in step 106(FIG. 1). In the present example, however, the results of the processing of step 104 correspond to a simplest example wherein first bar 202 (FIG. 2) and second bar 204 are each described with values relative to ordinate axis 206. Thus, first bar 202 has a value of four, whereas second bar 204 has a value of nine. One skilled in the art will recognize that the numbers four and nine may be represented as four-bit binary numbers. Thus an exemplary object level representation of bar chart 200 corresponds to the number four (i.e. 0100) being related to the number nine (i.e. 1001) as first bar 202 is related to second bar 204. Once this object level representation is created, processing may continue.

Returning to FIG. 1 and proceeding to step 108, the data created in step 106 is hashed using any of many well known hashing techniques, and it is preferable to sign the hash value for added security at step 110. It will be appreciated that utilizing well known content-dependent one way hash functions provides a higher level of security, and encryption with public and private keys is well known in the art. It is important to note, however, that other suitable cryptography protocols may also be used. For example, an encoding procedure using the one way hash algorithm MD5 is discussed in the context of image authentication in the article "Fragile imperceptible digital watermark with privacy control", C. W. Wu, D. Coppersmith, F. C. Mintzer, C. P. Tresser, and M. M. Yeung, IS&T/SPIE Conference on Security and Watermarking of Multimedia Content, SPIE 3657, Jan, 1999, incorporated herein by reference. The decoding process is similar to the encoding process with the verification done through an XOR operation. In any case, once the data is hashed and signed, it is possible to insert the hashed and signed data into the relevant portions of the graph as further detailed below.

Proceeding to step 112, data is converted to halftone pixel groups according to predefined binary classifications associated with combinations of halftone pixels. The predefined binary classifications can be used as a key such that only those having the key can decode the watermark. In the preferred embodiment, both the pre-hashed, unsigned object level representation data and the hashed, which is a hash function of the object level representation together with copyright and other information, and signed data are converted to halftone pixel groups according to the system and method of the present invention. The present example of such coding is further detailed with reference to FIG. 3, wherein sample binary halftone coding is shown that is consistent with the present invention. The halftone pixel groups 300 are enlarged for ease of demonstration, and each is shown associated with sample corresponding binary classes 302, wherein each binary class is depicted below its associated pixel group 300. Pixel positions are denoted with lines for purposes of demonstrating possible combinations among the pixel groups 300. In the example, the sample pixel groups 300 generally are defined by the presence and/or absence of pixels within the four pixel positions of each pixel group, and sixteen combinations result in the usual manner. It is important to note, however, that halftone pixels may be of varying size within each pixel group, so that presence and/or absence of pixels is not the only way to produce combinations of pixels within the pixel groups 300. Thus, an added level of security exists where it is not readily apparent how the combinations are produced. For example, a decrease in size of one pixel may serve the same purpose as an absence, and using different English letters or graphic patterns may also serve the same purpose. Also, many more than sixteen combinations may be produced where varying sizes of pixels or other graphical patterns are used. This additional level of security, however, is not the only level of security inherent to variable characteristics of the halftone pixel groups; additional levels of security are inherent to the variability of shape, size, and definition of binary classes regarding the pixel groups 300.

The variability of shape of the pixel groups 300 lends an added level of security. For example, the pixel groups 300 are of generally uniform shape in a preferred embodiment, but need not be of uniform shape. Uniform shape, however, facilitates the embedding process detailed below, and further types of uniform shapes envisioned for use with the present invention include but are not limited to rectangles, hexagons, octagons, decagons, etc. Further, L-shaped, T-shaped, and H-shaped structures of halftone pixels could be used, and further types of shapes can be extrapolated from the preceding lists. Thus, variability of shape and choice of shape serve to increase security. For example, even where the procedures of the method are known, the choice of shape for the pixel group 300 must also be known for decoding. A square shape is chosen for the present example for ease of insertion with a wide range of potential combinations and related shading characteristics.

Variability of size of the pixel groups adds another level of security. The square-shaped pixel groups of the present example consist of only four pixel positions per pixel group rather than, for example, sixteen or two-hundred fifty-six pixel positions. These other and further choices of increased size of pixel groups 300 may serve to further decrease visibility of the hidden data, but may also serve to decrease the number of pixel groups that may be embedded into a portion of graph. Still, the variability of size and choice of size serve to increase security. For example, even where the shape of the pixel group is known, the size of the pixel group may not be immediately apparent. Further, where neither size nor shape of the pixel group is known, difficulties associated with finding the hidden data to decode it are compounded.

A further level of security exists in the variability of definition and choice of definition for binary classes 302 associated with specific combinations of halftone pixel groups 300. The pixel groups 300 of FIG. 3, for example, possess different binary class definitions than the pixel groups 300 of FIG. 4. Thus, even where the size and shape of the pixel groups 300 are known in advance, the data cannot be successfully decoded unless the correct binary classes 302 are identified for each pixel group 300. When these variables are taken together, difficulties associated with detecting and/or decoding the hidden data where the choices are not known in advance are compounded. Overall, conversion of the data to halftone pixel groups allows the data to be embedded into the graph.

Figure 3:
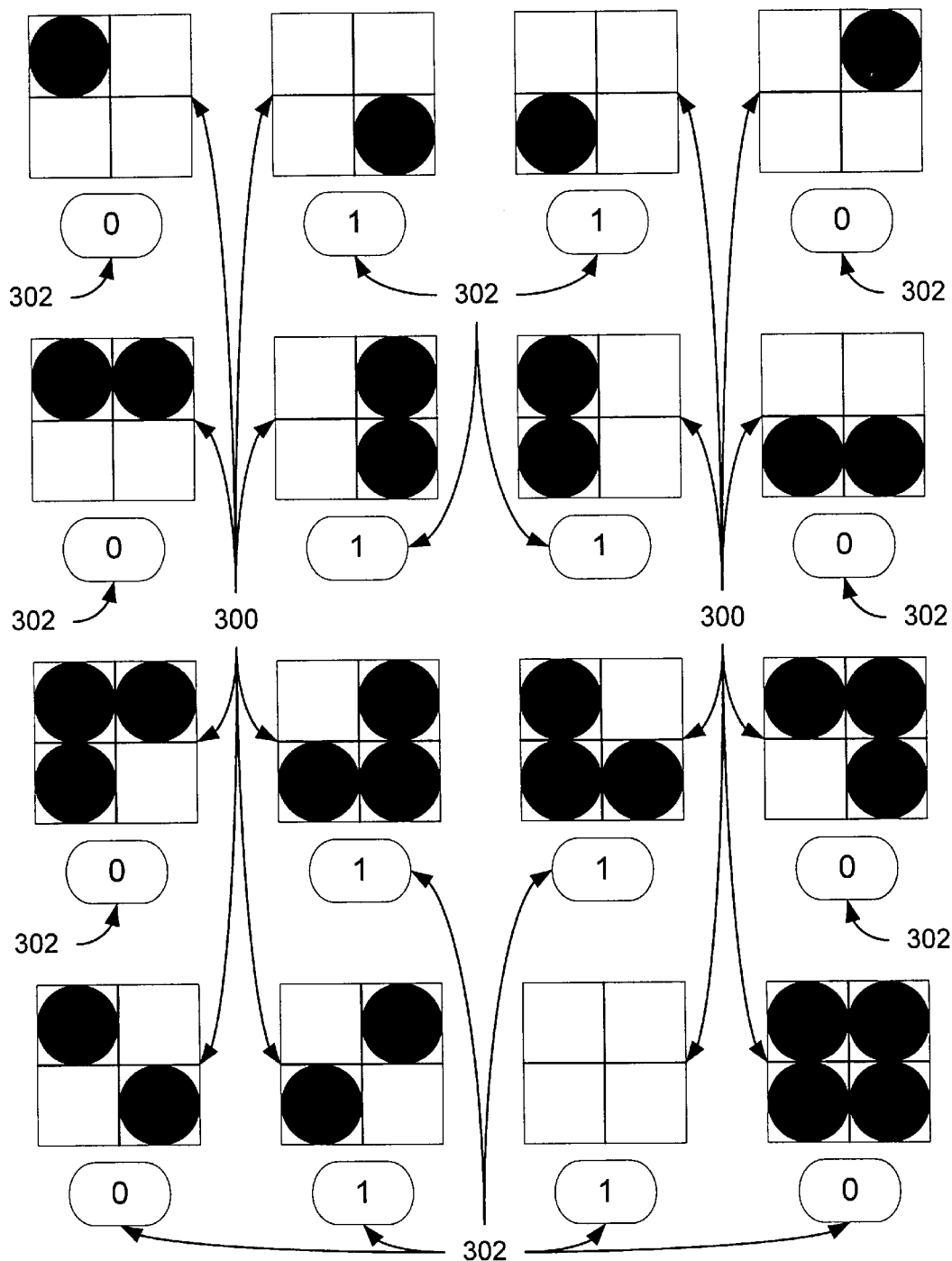
FIG. 3 is a block diagram depicting sample halftone pixel groups with associated binary class definitions according to the present invention.
Figure 4:
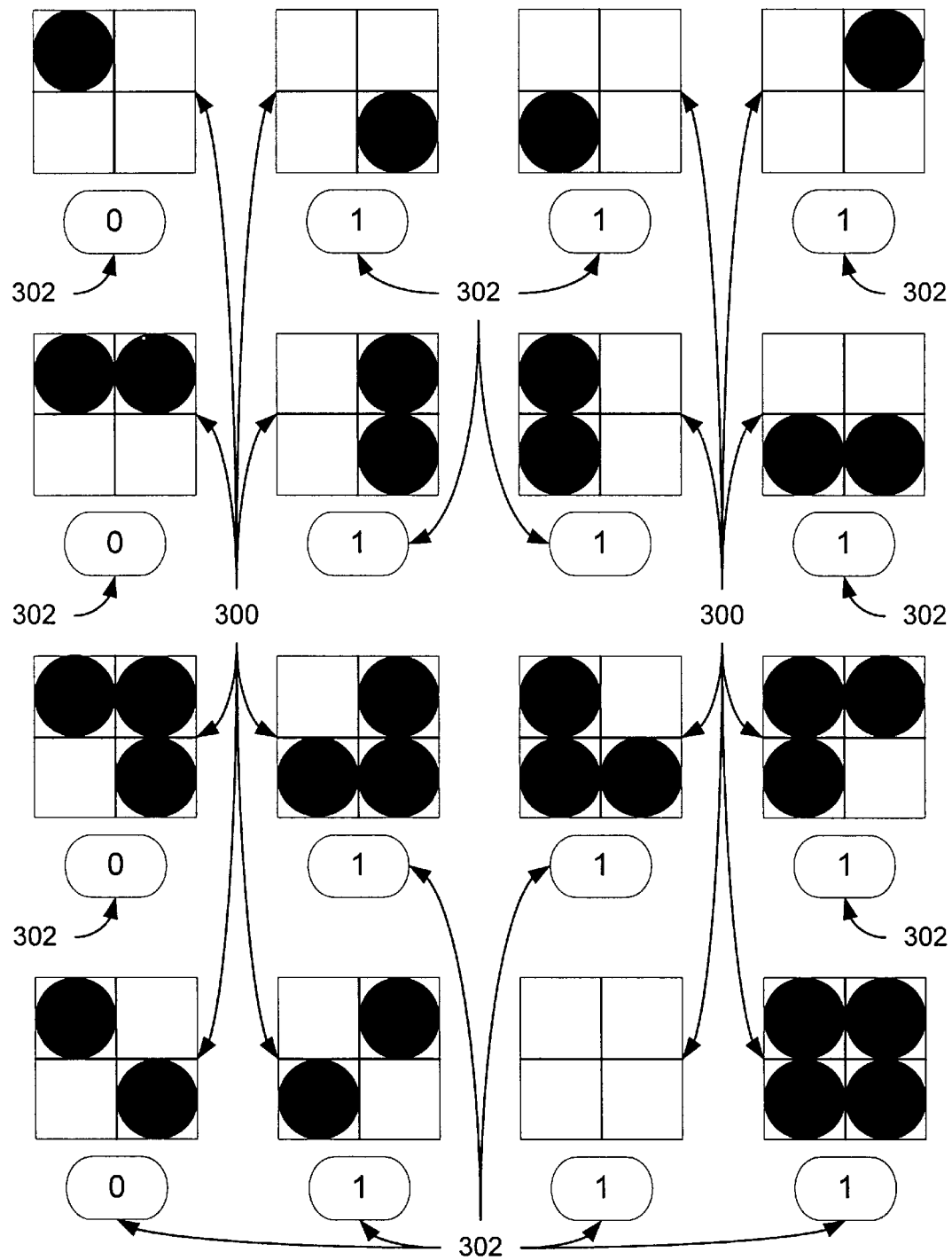
FIG. 4 is a block diagram depicting alternative binary class definitions according to the present invention.
Figure 5:
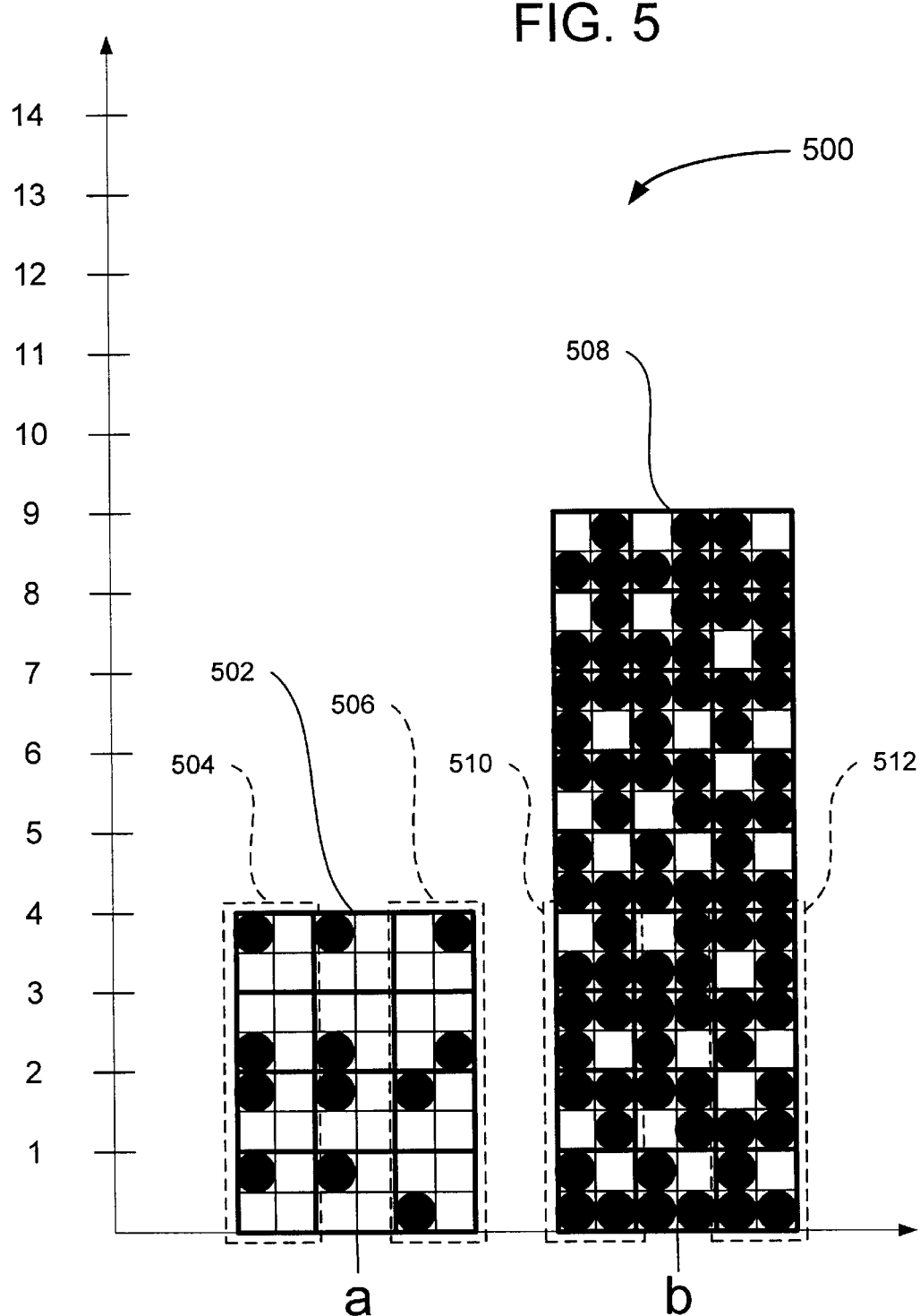
FIG. 5 is a sample graph depicting embedded halftone pixel groups according to the present invention.

Returning to FIG. 1 and proceeding to step 114, the pixel groups corresponding to the data are embedded into the graph by replacing at least part of the graph with the halftone pixel groups. With reference to FIG. 5, the bar graph 500 of the present example has a first bar 502 that is embedded with pixel groups corresponding to the four-bit binary number four (i.e. 0100) as shown at 504, and the same for its signed hash value, five (i.e. 0101) as shown at 506. For this process the binary class definitions of FIG. 3 are used in the present example. Similarly first bar 502 (FIG. 5), second bar 508 is embedded with pixel groups corresponding to the four-bit binary number nine (i.e. 1001) as shown at 510, and the same for its signed hash value, three (i.e. 0011) as shown at 512. Notice that the above example is merely an illustration of the process of current invention. In a practical system, the hash value should be 128 bit or longer to be computationally feasible to prevent brute force attack. In some applications and practical systems, it is preferred that only the signed hash value is embedded for security. In other applications, the above mentioned double embedding method shall provide the capability of recovery modifications in addition to the capability of detection of modifications. These modifications include unintentional modifications and intentional attacks. Processing may then cease at 116, and the document contents thus produced may be stored in memory operable with a data processing system and/or embedded in a propagating wave for use in a data processing system. Such a system may be a document generation system and/or a data hiding system, such as a digital watermarking system.

Recognizably, each four bit number of data in the present example is converted to pixel groups in a top down fashion, so that the pixel groups proceed down the page. Also recognizably, pixel group clusters are embedded into the graph in a bottom up fashion, so that the pixel group clusters proceed up the page. Also recognizably, the data streams are embedded into the graph in a left to right fashion. Also recognizably, the first row of the pixel groups in bar graph 508 contains redundant data. Also recognizably, repetition of code is used in both 502 and 508, each of different times. For example, 502 features repetition that is one time for the original value and zero times for the signed hash value, whereas 508 features repetition that is three times for the original value and one time for the signed hash value. Each of these fashions of embedding is optional, and embedding could occur left to right or vice versa in any one of many combinations. Repetition of code is also optional. Although limited to the upper bound of data hiding capacity, the times of repetition can vary. In many applications, it is also preferable to embed only the signed hash value. Thus, the variability associated with fashions of embedding adds additional levels of security as a decoder must know or be able to determine the fashion in which the embedding occurred in order to reverse the process. Consequently, the resulting graph contains hidden data that possesses many levels of security. The choices of aforementioned aspects/variables may be specified in a secret key K of 128 bits or longer, for encoding and decoding.

Figure 6:
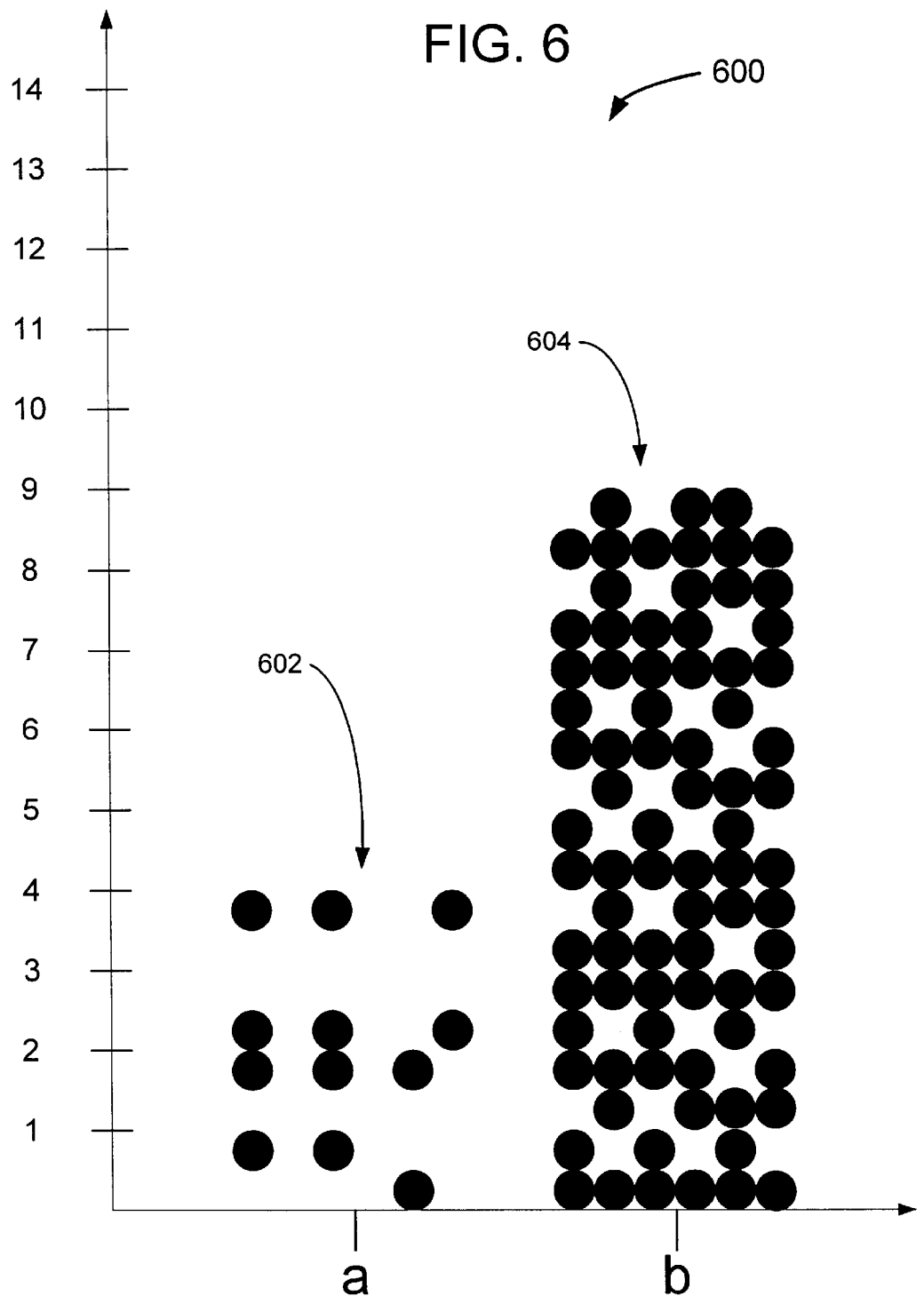
FIG. 6 is a sample graph depicting hidden data according to the present invention.

Referring to FIG. 6, a resulting bar graph 600 is shown, wherein the lines denoting pixel position have been removed to more accurately depict the final appearance of the graph. It is important to recall that the pixels of the bar graph 600 are greatly enlarged to demonstrate the present invention, and that halftone pixel groups embedded into the graph of realistic size accomplishes hiding of the data. One should also appreciate that the pixel groups used in first bar 602 achieve a lighter shading effect than the pixel groups of second bar 604, and that appropriate choices regarding pixel groups must be made to accomplish a satisfactory final appearance.

Further manners in which the present invention may be employed include embedding of information into text. For example, an ASCII or Unicode equivalent of a text character maybe authenticated using one way hash function and the signed hash value may be embedded into a sequence of text characters of the document or in the graphs of the document. It is possible to embed the watermark, such as the signed hash value, using halftone pixel groups into only a portion of the binary text content, such as the title line or header lines. It is also possible to embed watermark, such as the signed hash value, using halftone pixel groups into only a portion of the binary content of a graph. It is presently preferred, however, to embed halftone pixel groups into an entire graph to achieve uniformity of appearance, and also to define relationships between nodes on an analogical and/or identity basis. In a practical system, it is preferable to embed the watermark multiple times in both the node itself and across the graph. This ensures protection against both node modification and node deletion attacks. If the data hiding capacity is small that it does not allow multiple times of embedding, a selection of self embedding and cross embedding should be according to the application need. In addition, if a hash value is graph-based instead of node-based, the data hiding capacity need can be further reduced. Additionally, if the original value of each note is not embedded, less data hiding capacity is needed. The design of a specific system should be based on the application need and the data hiding capacity of each graph or document. As a result, the bar graph 600 possesses hidden data indicating the authentication value of a graph and any modification on a graph may be detected by an authentication method of the present invention.

Figure 7:
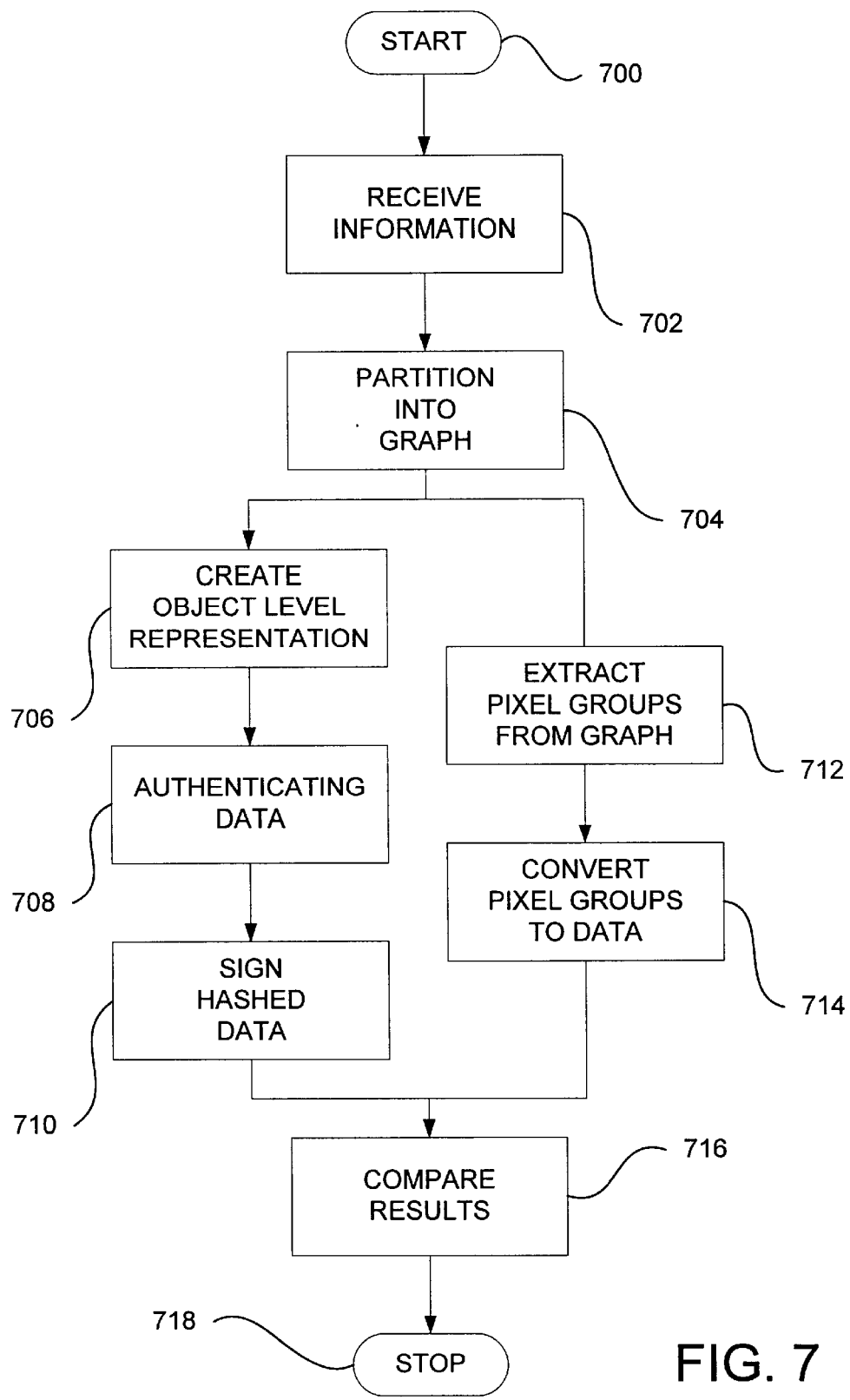
FIG. 7 is a flowchart diagram depicting a document authentication method that employs a method of extracting hidden data according to the present invention.

Referring to FIG. 7, a method for authenticating document contents is shown that operates according to a method of the present invention for extracting hidden data from document contents. Starting at 700, the method proceeds to step 702 where information is received relating to document contents, wherein the document contents include halftone pixel groups. As with step 102 (FIG. 1), this information may take several forms. In an exemplary form, the information corresponds to the document in digital form as an electronic file, and this file may constitute the original form of the document, a scanned bitmap from a physical document, or similar incarnations of the document. In the present example, the information received corresponds to a bit map of a document containing graph and text, wherein the graph is at least partly comprised of halftone pixels.

Proceeding to step 704 (FIG. 7), the document contents are partitioned into graph and text. This step is essentially the same as step 104 (FIG. 1), and may be optional depending on the type of application. In alternative embodiments, step 704 (FIG. 7) may be optional, and whether the step is optional depends primarily on the steps followed to hide the information in the document contents. The relevant point is that the method for extracting the hidden information must complement the method for hiding the information, and once the graph has been partitioned it is possible to create an object level representation of the graph at step 706 as was done in step 106 (FIG. 1). Step 108 and step 110 likewise serve as models for step 708 (FIG. 7) and step 710 respectively, and it is necessary to use the same object level representation technique, hashing technique, and signing technique as was used when the data was hidden in the document contents. Thus, it may be necessary to possess the appropriate keys for performing the hash and signing functions.

Proceeding also from step 704 to step 712, groups of halftone pixels are extracted from the partitioned portion of the document contents. The technique for extracting the correct pixel groups in the proper combinations must complement the technique use to embed the pixel groups, and must also incorporate the the same definitions of binary classification, size, shape, embedding direction, and repetition times related to the pixel groups. These definitions may be used as a key K of size 128 bits or longer and transmitted to the receiver securely via a secure communication channel.

Once the pixel groups are properly extracted, it is possible to convert the halftone pixel groups to the data according to predefined binary classifications associated with combinations of halftone pixels at step 714. Thus, it is necessary to incorporate the same binary class definitions for the same pixel groups as were used in the data hiding process. Resulting extracted data may thus be stored in memory operable with a data processing system and/or embedded in a propagating wave for use in a data processing system. Such a system may be a document authentication system and/or a hidden data extraction system.

Once the object level representation has been completed, the reconstructed data has been hashed and signed, and the extracted pixel groups have been converted to extracted data, it is possible to compare the forms of reconstructed data to the forms of extracted data at step 716 to verify authenticity, and then to stop at 718.

Using the preferred embodiment, it is often possible to determine what the original document looked like even where considerable modification has taken place. Further, the methods of hiding and extracting data of the present invention are generally robust in that slight modification can be detected while the document can be reproduced many times. It also may be robust against some geometric transformations, such as scaling and rotation, and even nonlinear geometric transformations. Reproduction is less robust where copies are made, and a one-hundredth generation copy is not likely to retain the hidden information in a reliably extractable form. On the other hand, electronic reproduction may occur indefinitely without hampering extractability.

Variations on the present invention that complement further uses consistent with the present disclosure may also be implemented. For example, the present invention can also be used to embed other kinds of digital watermarks such as an ID or time stamp. In this case, steps 106, 108, and 110 (FIG. 1) should be replaced with a step 'generate watermark data', and steps 706, 708, 710, and 716 should be deleted.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for hiding data in document contents, the method comprising:

receiving information relating to the document contents, wherein at least part of the document contents are of a binary nature;

determining the presence of at least one object having at least one binary portion in the document by analyzing the document;

associating a mapping between at least one binary class with at least one set of combinatorial halftone pixel patterns, wherein said binary class comprises at least one binary data element associated with at least one halftone pixel pattern that is a member of said set of combinatorial half-tone pixel patterns;

converting the data to halftone pixel groups of at least two pixels by using said mapping to select at least one halftone pixel pattern for each datum in the data, and replacing said binary portion of the object with the halftone pixel groups.

2. The method of claim 1, the method further comprising calculating a hash value based on the data.

3. The method of claim 2, the method further comprising signing the hash value.

4. A propagating wave for transmission over a data processing system, the wave comprising the document contents created by the method of claim 1.

5. Information stored in memory operable with a data processing system, the information corresponding to the document contents created by the method of claim 1.

6. A digital watermarking system, the system operating according to the method of claim 1.

7. A method for extracting data hidden in document contents, the method comprising:

associating a mapping between at least one binary class with at least one set of combinatorial halftone pixel patterns, wherein said binary class comprises at least one binary data element associated with at least one halftone pixel pattern that is a member of said set of combinatorial half-tone pixel patterns;

receiving information relating to the document contents, wherein the document contents include halftone pixel groups;

extracting the halftone pixel groups from the document contents; and converting the extracted halftone pixel groups of at least two pixels to the data by using said mapping to determine at least one datum mapped to at least one halftone pixel pattern in the extracted halftone pixel groups, wherein each binary class is associated independently of average grey scale level of each one of the extracted pixel group with multiple combinatorial patterns of halftone pixels.

8. A propagating wave, the wave comprising the data extracted according to the method of claim 7.

9. Information stored in memory operable with a data processing system, the information corresponding to the data extracted according to the method of claim 7.

10. A method for authenticating document contents, the method operating according to the method of claim 7, the method further comprising:

analyzing the document contents;

constructing an object level representation of the document contents; and producing additional data based on the object level representation.

11. The method of claim 10, the method further comprising calculating a hash value based on the additional data.

12. The method of claim 11, the method further comprising signing the hash value.

13. The method of claim 10, the method further comprising the data to the additional data.

14. A document authentication system, the system operating according to the method of claim 10.

* * * * *

UNITED STATES PATENT AND TRADEMARK OFFICE
CERTIFICATE OF CORRECTION

PATENT NO. : 6,775,394 B2
DATED : August 10, 2004
INVENTOR(S) : Yu

It is certified that error appears in the above-identified patent and that said Letters Patent is hereby corrected as shown below:

Title page,
Item [56], References Cited, OTHER PUBLICATIONS,
"Kracker et al. "Joint halftoning and watermarking" Proc. International Conference of Image Processing 2000, vol. 2, p. 69-72, Sept. 2000." should be
-- Kacker et al. "Joint halftoning and watermarking" Proc. International Conference on Image Processing 2000, vol. 2, pp. 69-72, Sept. 2000. --
"Bittman, et al., "Robust MPEG Video Watermarking Technologies", ACM Multimedia, 1998, pp. 71-80." should be
-- Dittman, et al. "Robust MPEG Video Watermarking Technologies", ACM Multimedia, 1998, pp. 71-80. --
"Lin, et al., "ISSues and Solution for Authenticating MPEG Video", SPIE vol. 2657, Jan. 1999, pp. 54-65." should be -- Lin, et al., "Issues and Solution for Authenticating MPEG Video", SPIE vol. 3657, jan. 1999, pp. 54-65. --
"podlichuk, et al., "Image Adaptive Watermarking Using Visual Models", IEEE Journal Selected Areas of Communications, vol. 16 No. 4, May 1998." should be
-- Podilchuk, et al., "Image Adaptive Watermarking Using Visual Models", IEEE Journal Selected Areas of Communications, vol. 16 No. 4, May 1998. --

Column 10,
Lines 15 and 16, after "comprising" insert -- comparing --.

Signed and Sealed this

Twelfth Day of April, 2005

JON W. DUDAS
*Director of the United States Patent and Trademark Office*